USO05200870A

United States Patent [19]

Draaisma et al.

[11] Patent Number: 5,200,870
[45] Date of Patent: Apr. 6, 1993

[54] THIN-FILM MAGNETIC HEAD CONNECTION STRUCTURE

[75] Inventors: Eeltje A. Draaisma; Arie H. Van Heeren; Franciscus A. Pronk, all of Eindhoven, Netherlands

[73] Assignee: U.S. Philips Corporation, New York, N.Y.

[21] Appl. No.: 870,726

[22] Filed: Apr. 15, 1992

Related U.S. Application Data

[63] Continuation of Ser. No. 686,330, Apr. 16, 1991, abandoned.

[30] Foreign Application Priority Data

May 17, 1990 [NL] Netherlands .......................... 9001146

[51] Int. Cl.[5] .............................................. G11B 5/147
[52] U.S. Cl. .................................... 360/126; 360/125; 360/122
[58] Field of Search ............... 360/126, 125, 123, 122, 360/127

[56] References Cited

U.S. PATENT DOCUMENTS

| 4,685,014 | 8/1987 | Hanazono et al. | 360/126 |
| 4,743,988 | 5/1988 | Sato et al. | 360/126 |
| 4,819,112 | 4/1989 | Iwata et al. | 360/126 |
| 4,949,209 | 8/1990 | Imanaka et al. | 360/126 |

Primary Examiner—John H. Wolff
Attorney, Agent, or Firm—Norman N. Spain

[57] ABSTRACT

A thin-film magnetic head has a connecting tab (22), provided on a substrate (23) for the connection of an external connecting track (16). In the region of a central portion (21) of the connecting tab an auxiliary layer (26) is provided between the connecting tab (22) and the substrate (23), as a result of which the central portion (21) of the connecting tab is located at a larger distance from the substrate than coating portions (24) of a shielding layer (25). This provides a proper contact between the external connecting track (16) and the connecting tab (22), even if the external connecting track (16) is in not such a good position with respect to the connecting tab (22).

3 Claims, 3 Drawing Sheets

THIN-FILM MAGNETIC HEAD CONNECTION STRUCTURE

This is a continuation of application Ser. No. 07/686,330, filed on Apr. 16, 1991, now abandoned.

BACKGROUND OF THE INVENTION

The invention relates to a thin-film magnetic head, having a substrate on which at least one multilayer magnetic head structure is present, the structure including at least one connecting tab for connecting to a connecting track, the edges of the connecting tab being covered by covering portions of a shielding layer.

Such a structure of a thin-film magnetic head provided with a connecting tab is generally used for connecting the magnetic head to signal processing means. In such means, a the connecting track is present, in particular an external connecting track, which is often located on a flexible foil. This foil then must be aligned with respect to the magnetic head during assembly, to such an extent that the external connecting track is located between the covering portions of the shielding layer in order to make a good electrical connection with the central uncovered portion of the connecting tab. During manufacture of the prior art magnetic head, after a portion of the shielding layer has been removed by etching, portions of the shielding layer are left behind covering the connecting tab edges due to alignment tolerances of the etch masks with respect to the connecting tab. Because of the presence of the covering portions, higher requirements must be satisfied as regards the positioning accuracy during connection of the external connecting track. The occurrence of these covering portions cannot be avoided by simple means. If the external connecting track is not positioned correctly between the covering portions of the shielding layer, but is located partly on the shielding layer, then the contact with the connecting tab is greatly reduced, which might cause problems as regards the electric connection. To avoid this problem, high requirements are imposed on the positioning of the external connecting track with respect to the connecting tab.

OBJECTS AND SUMMARY OF THE INVENTION

An object of the invention is to provide a structure of a thin-film magnetic head, in which a good contact between the connecting tab and the connecting track is guaranteed, while lower requirements as regards the positioning accuracy are to be satisfied.

To this end, the thin-film magnetic head according to the invention, is characterized, in that a central portion of the connecting tab, located between the edges of the connecting tab has at least the same height from the substrate as the covering portions of the shielding layer. If the connecting track is now shifted with respect to the connecting tab, the size of the contact plane is indeed reduced, but a contact plane is preserved (see FIG. 7). This is in contrast with the prior art thin-film magnetic head described above, in which the contact is reduced to a line contact, when the positioning has been carried out inaccurately (see FIG. 4).

DETAILED DESCRIPTION OF THE INVENTION

In a preferred embodiment of the thin-film magnetic head, in which the central uncovered portion of the connecting tab, taken in a direction from the substrate, is at a level equal to or higher than the shielding layer, at least an auxiliary layer is provided between the substrate and the connecting tab, in the region of the central portion of the connecting tab.

Preferably, this auxiliary layer is part of at least one of the layers of the magnetic head structure. Consequently no additional manufacturing steps are required to raise the level of the connecting tab. Only the etch masks must be adapted to such an extent that a portion of a previously deposited layer of the magnetic head structure remains present in the region of the connecting tab.

The invention will now be explained in greater detail with reference to an embodiment of the thin-film magnetic head according to the invention, shown in the accompanying Figures.

Figure 1:
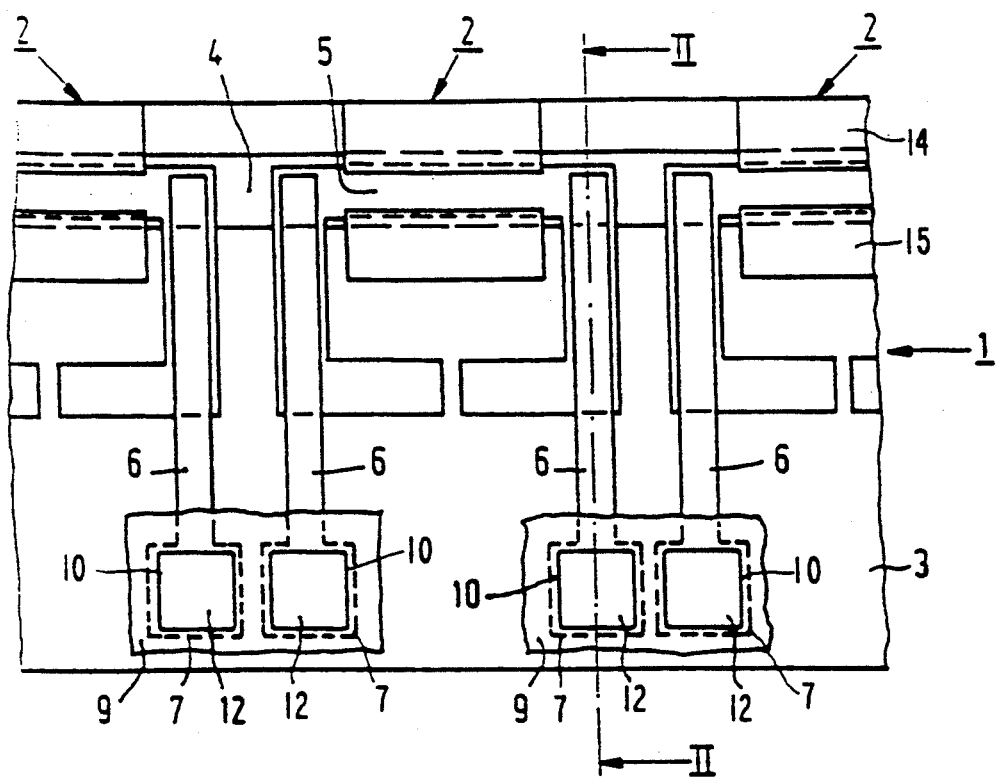
FIG. 1 is a plan view of a prior art thin-film magnetic head provided with a plurality of magnetic head structures.

FIG. 1 shows a prior art thin-film magnetic head 1 provided with a plurality of magnetic head structures 2. The magnetic head is assembled from several layers present on a substrate 3, comprising a first layer having an electrical conductor 4, a second layer having a magneto-resistance element 5 and a third layer having connecting strips 6 and connecting tabs 7. Insulating layers 8 (see FIG. 2) are located between the substrate and the first and second layers and a shielding layer 9 is located on the third layer. In the region of the connecting tabs 7 the shielding layer 9 has been etched away to allow the connection of external signal processing means. After etching, covering portions 11 of the shielding layer 9 are left behind on the edges 10 of the connecting tab as a result of alignment tolerances of the etch mask and a central portion 12 of the connecting tap 7 is not coated.

Figure 2:
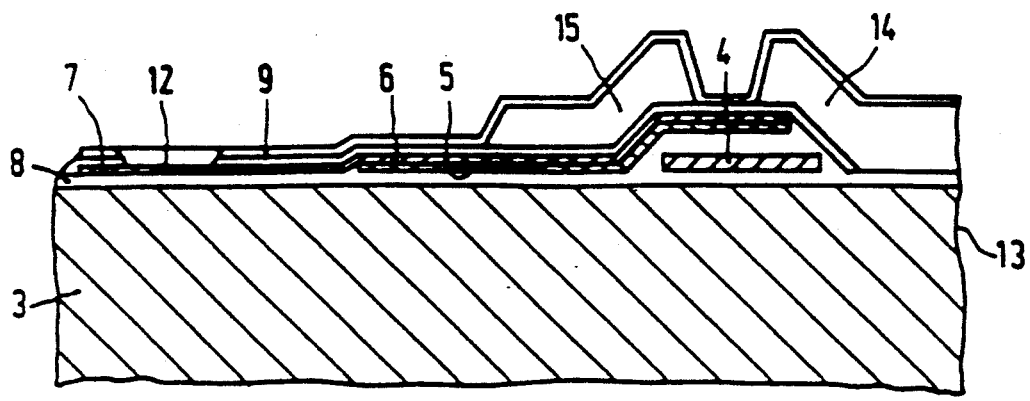
FIG. 2 is a cross-sectional view of the prior art thin-film magnetic head of FIG. 1, through 11—11.

FIG. 2 is a cross-sectional view of the thin-film magnetic head shown in FIG. 1. The substrate 3 acts as a flux conductor. Furthermore, a leading (front) flux conductor 14 is present contiguous to a head face 13 and a rear flux conductor 15 is located at some distance from the front flux conductor. The distance between the leading and rear flux conductors is magnetically bridged by the magneto-resistance element 5, which is, for example, in the shape of a ring in order to achieve a proper operation (see FIG. 1) and is interrupted at that side of the rear flux conductor that is remote from the head face. The magneto-resistance element 5 is connected to the connecting tabs 7 via the connecting strips 6.

Figure 3:
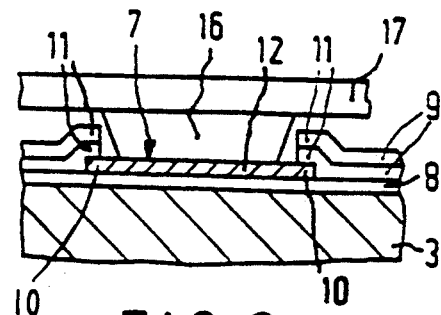
FIG. 3 is a cross-sectional view showing a correct connection between a connecting tab of the prior art magnetic head and an external connecting track.
Figure 4:
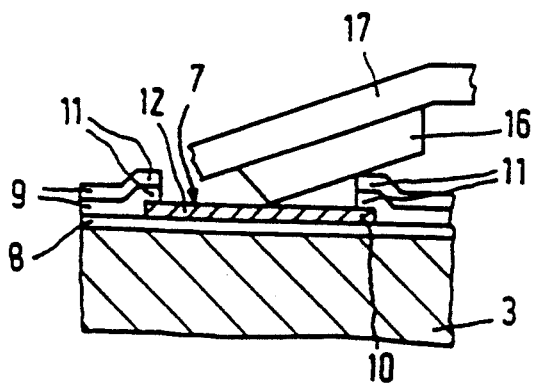
FIG. 4 is a cross-sectional view showing a poor connection between a connecting tab of the prior art magnetic head and an external connecting track.

The connection to external means is effected by connecting tracks to the connecting tabs. FIG. 3 shows a correct connection between a connecting track 16, more specifically an external connecting track, present on a flexible foil 17, and a connecting tab 7. For this correct connection, the external connecting track 16 must be positioned accurately with respect to the connecting tab 7, in such a manner that the external connecting track 16 is located between the coating portions 11 of the shielding layer 9 on the connecting tab 7. FIG. 4 shows a connection in which the foil 17 has not been positioned accurately relative to the connecting tab 7, which reduces the contact between the external connecting track 16 and the connecting tab 7 to a contact line. between the connecting tab 22 and the substrate 23 in the region of the uncovered portion 21 of the connecting tab (see also FIG. 7). This auxiliary layer 26 constitutes a portion of a first layer of the magnetic head structure 28 of which the electrical conductor 29 also forms part. After structuring this layer the auxiliary layer 26 remains present on the substrate 23, together with the electrical conductor 29. This renders additional manufacturing steps for forming the auxiliary layer 26 superfluous.

By placing a central portion 21 of the connecting tab 22, which has remained bare (see FIG. 7) at an equal or a larger height from the substrate 23 than the covering portions 24 of the shielding layer 25, a proper contact between the external connecting track 16 and the connecting tab 22 is obtained, also in case of a less well positioned foil 17 with respect to the magnetic head 20.

Figure 7:
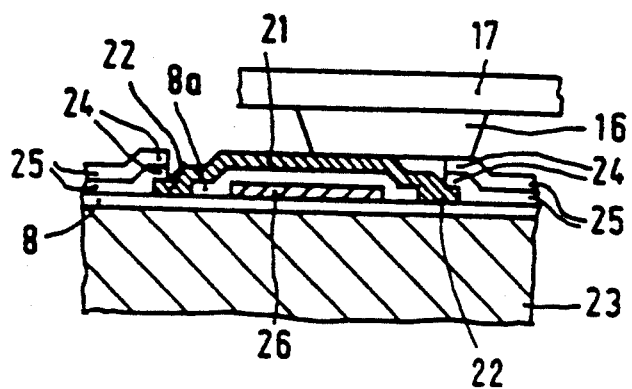
FIG. 7 is a cross-sectional view showing a connection between a connecting tab of the magnetic head according to the invention and an external connecting track.
Figure 5:
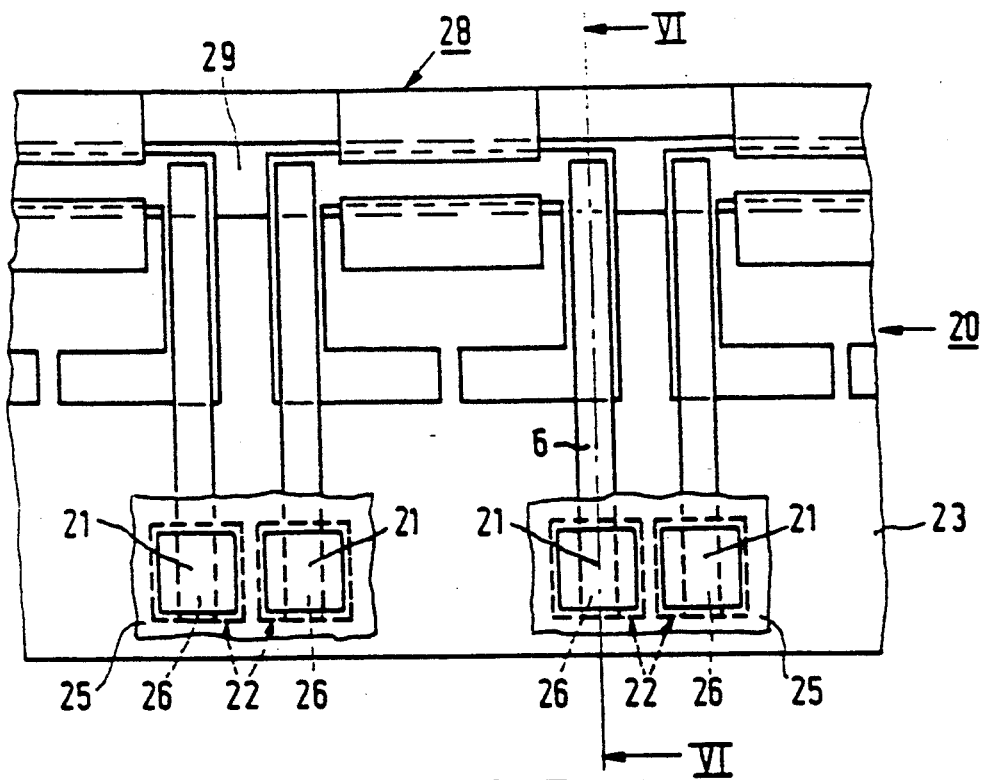
FIG. 5 shows a plan view an embodiment of the thin-film magnetic head according to the invention.
Figure 6:
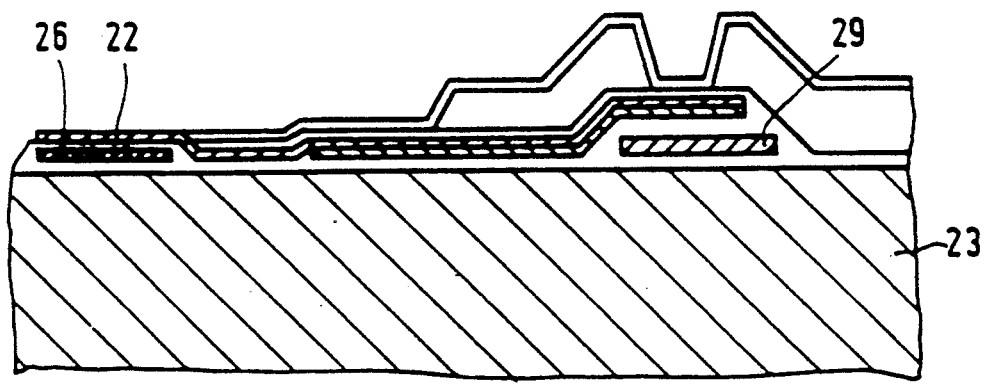
FIG. 6 is a cross-sectional view of the thin-film magnetic head according to the invention, shown in FIG. 5.

FIG. 7 shows that even if the foil 17 is positioned less accurately with respect to the connecting tab 22, the external connecting track 16 still makes contact via one plane with the uncoated portion 21 of the connecting tab 22.

It should be noted that the invention is not limited to the embodiment shown here. The structure of the raised connecting tab may also be used in other magnetic head construction, as, for example, in a writing head structure, instead of the reading head structure shown here. It is equally well possible to use the construction in a single-track magnetic head structure rather than in the multi-track magnetic structure shown here.

We claim:

1. A thin-film magnetic head, having a substrate and at least a multilayer magnetic head structure present on the substrate, said structure including a shielding layer and at least one connecting tab for connecting said magnetic head structure to a connecting track external to said magnetic head, the edges of said connecting tab being covered by covering portions of said shielding layer, characterized in that the height from the substrate of a central portion of said connecting tab, uncovered by said covering portions, is at least as large as the height from the substrate of said covering portions.

2. A thin-film magnetic head as claimed in claim 1, characterized in that in the region of the central portion of the connecting tab at least one auxiliary layer is provided between the substrate and the connecting tab.

3. A thin-film magnetic head as claimed in claim 2, characterized in that the auxiliary layer forms part of at least one of the layers of the magnetic head structure.

* * * * *